(12) United States Patent
Pfister et al.

(10) Patent No.: US 11,598,433 B2
(45) Date of Patent: Mar. 7, 2023

(54) POPPET VALVE AND METHOD OF MANUFACTURING VALVE COMPONENTS OF A POPPET VALVE

(71) Applicant: BURCKHARDT COMPRESSION AG, Winterthur (CH)

(72) Inventors: Matthias Pfister, Winterthur (CH); Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 17/284,107

(22) PCT Filed: Oct. 4, 2019

(86) PCT No.: PCT/EP2019/076900
§ 371 (c)(1),
(2) Date: Apr. 9, 2021

(87) PCT Pub. No.: WO2020/074382
PCT Pub. Date: Apr. 16, 2020

(65) Prior Publication Data
US 2021/0356049 A1 Nov. 18, 2021

(30) Foreign Application Priority Data
Oct. 9, 2018 (EP) ..................................... 18199261

(51) Int. Cl.
*F16K 15/10* (2006.01)
*B22F 10/20* (2021.01)
(Continued)

(52) U.S. Cl.
CPC ............. *F16K 15/10* (2013.01); *B22F 5/008* (2013.01); *B22F 10/20* (2021.01); *B33Y 80/00* (2014.12)

(58) Field of Classification Search
CPC ..... Y10T 137/786; F16K 15/08; F16K 15/10; F04B 39/1053
See application file for complete search history.

(56) References Cited

U.S. PATENT DOCUMENTS 870,659 A * 11/1907 Ackermann ............ F16K 15/10
137/516.13
921,892 A * 5/1909 Rogler .................... F16K 15/10
137/516.13
(Continued)

FOREIGN PATENT DOCUMENTS

EP 3287676 B1 2/2020
FR 859131 A * 12/1940 .............. F04B 39/10
(Continued)

OTHER PUBLICATIONS

FR-1467898-A Machine Translation (Year: 1967).*
(Continued)

*Primary Examiner* — Michael W Hotchkiss
(74) *Attorney, Agent, or Firm* — Brooks Kushman P.C.

(57) ABSTRACT

Poppet valve, plate valve, with a longitudinal axis (L), with a valve seat having a plurality of valve seat passage channels, with a catcher arranged at a distance from the valve seat in the direction of the longitudinal axis (L), and with a sealing element arranged movably between the valve seat and the catcher for opening and closing the valve seat passage channels. One of the valve components formed as the valve seat or the catcher having a plurality of passage channel limiting sections and a plurality of web portions, each extending mutually at an angle (α), wherein at least one of the valve components formed as valve seat or catcher is produced at least in sections by additive manufacturing, and wherein at least one of the passage channel limiting sections is dimensioned shorter in the direction of the longitudinal axis (L).

17 Claims, 6 Drawing Sheets

(51) Int. Cl.
*B22F 5/00* (2006.01)
*B33Y 80/00* (2015.01)

(56) References Cited

U.S. PATENT DOCUMENTS

| | | | | |
|---|---|---|---|---|
| 1,081,803 A * | 12/1913 | Alley | F16K 15/10 | 137/516.13 |
| 1,222,321 A * | 4/1917 | Peters | F04B 39/1053 | 137/512.1 |
| 1,302,084 A * | 4/1919 | Peters | F16K 15/10 | 137/516.13 |
| 1,316,184 A * | 9/1919 | Prellwitz | F16K 15/10 | 137/516.13 |
| 1,350,101 A * | 8/1920 | Keller | F16K 15/12 | 137/512.15 |
| 1,385,147 A * | 7/1921 | Prellwitz | F16K 15/10 | 137/516.13 |
| 1,669,424 A * | 5/1928 | Schneider | F16K 15/10 | 137/516.13 |
| 1,691,689 A * | 11/1928 | West | F16K 15/10 | 137/506 |
| 1,799,103 A * | 3/1931 | Klimek | F16K 15/10 | 137/550 |
| 1,935,376 A * | 11/1933 | Prellwitz | F16K 15/08 | 137/454.4 |
| 2,186,489 A * | 1/1940 | Kehler | F16K 15/10 | 137/516.13 |
| 2,501,744 A * | 3/1950 | Seligmann | F16K 15/10 | 137/516.13 |
| 2,604,296 A * | 7/1952 | Kehler | F16K 15/10 | 137/516.13 |
| 2,804,090 A * | 8/1957 | Kehler | F16K 15/10 | 137/516.13 |
| 2,870,783 A * | 1/1959 | Kehler | F04B 39/1053 | 137/516.13 |
| 3,056,425 A * | 10/1962 | Kehler | F16K 15/10 | 137/516.21 |
| 3,124,154 A * | 3/1964 | Kehler | F04B 39/1053 | 137/512 |
| 3,134,399 A * | 5/1964 | Deminger | F16K 15/10 | 137/512.1 |
| 3,327,731 A * | 6/1967 | Kehler | F04B 39/1053 | 137/516.13 |
| 3,360,006 A * | 12/1967 | Kehler | F16K 15/08 | 137/516.21 |
| 3,428,082 A * | 2/1969 | Kohler | F16K 15/10 | 137/516.23 |
| 3,703,912 A * | 11/1972 | Bauer | F16K 15/08 | 137/514 |
| 3,792,718 A * | 2/1974 | Kohler | F04B 39/1053 | 137/516.19 |
| 4,402,342 A * | 9/1983 | Paget | F16K 15/16 | 137/516.13 |
| 4,852,608 A * | 8/1989 | Bennitt | F04B 39/1053 | 137/516.13 |
| 4,854,341 A * | 8/1989 | Bauer | F04B 39/1053 | 137/516.21 |
| 9,717,298 B1 | 8/2017 | Barrett, Jr. | | |
| 9,765,770 B2 * | 9/2017 | Babbini | F16K 15/08 | |
| 11,009,017 B2 * | 5/2021 | Babbini | F04B 39/08 | |
| 2008/0149196 A1 * | 6/2008 | Spiegl | F04B 39/1066 | 137/543.15 |
| 2016/0223117 A1 | 8/2016 | Hitzelberger | | |
| 2017/0350380 A1 | 12/2017 | Bagagli et al. | | |
| 2018/0058595 A1 | 3/2018 | Grayson et al. | | |
| 2021/0025508 A1 * | 1/2021 | Schulz | F16K 25/04 | |

FOREIGN PATENT DOCUMENTS

| | | | | |
|---|---|---|---|---|
| FR | 1126203 A | | 11/1956 | |
| FR | 1467898 A | * | 2/1967 | F04B 39/10 |
| GB | 1025713 A | | 4/1966 | |
| JP | 2010112405 A | | 5/2010 | |
| NL | 46951 C | | 5/1939 | |
| WO | 2004065790 A1 | | 8/2004 | |
| WO | WO-2020018067 A1 | * | 1/2020 | |

OTHER PUBLICATIONS

FR859131A Machine Translation (Year: 1940).*
International Search Report for PCT/EP2019/076900, Prepared by the European Patent Office, dated Dec. 5, 2019.

* cited by examiner

POPPET VALVE AND METHOD OF MANUFACTURING VALVE COMPONENTS OF A POPPET VALVE

CROSS-REFERENCE TO RELATED APPLICATION

This application is the U.S. national phase of PCT Application No. PCT/EP2019/076900 filed on Oct. 4, 2019, which claims priority to EP Patent Application No. 18199261.1 filed on Oct. 9, 2018, the disclosures of which are incorporated in their entirety by reference herein.

The present invention relates to a poppet valve, in particular a plate valve, a valve component for such a poppet valve, and a method of manufacturing valve components for such a poppet valve.

BACKGROUND ART

So-called plate valves or ring plate valves, which can be used in piston compressors, are known from the prior art, for example from WO 2004/065790 A1. Such plate valves usually have a valve seat, a valve catcher and at least one sealing element arranged between the valve seat and the valve catcher. The sealing element is movably arranged in the valve seat for opening and closing passage channels.

When the passage channels of the plate valve are closed, the sealing element comes into contact with the valve seat so that the closing forces acting on the sealing element are absorbed or dissipated by the valve seat. In view of the associated mechanical loads, the valve seat must be designed to be particularly stable. For this purpose, the valve seats in question are usually milled from a solid blank. The passage channels are thus formed by milling in a plate-shaped blank. On the one hand, this involves high manufacturing costs. In addition, the passage channels produced by milling, which can be groove-like in shape, for example, have a relatively large extension in the longitudinal axial direction of the valve seat—i.e. along the height of the valve seat—which results in a relatively high pressure loss for the fluid flowing through.

THE PRESENT INVENTION

In view of this prior art, it is the object of the present invention to provide a poppet valve that can be manufactured with only little effort and at the same time has improved operating characteristics. A further object of the present invention was to provide a valve component for such a poppet valve.

With respect to the poppet valve, this object has been solved by the subject matter of claim 1. A valve component according to the invention is given in claim 20. A method of manufacturing valve components according to the invention is given in claim 21. Advantageous embodiments are provided in the dependent claims and are discussed below.

A poppet valve according to the invention is in particular a plate valve or a ring plate valve. Such a poppet valve or plate valve is designed in particular for use in a piston compressor.

A poppet valve according to the invention comprises a valve seat, a catcher arranged at a distance from the valve seat, and at least one sealing element movably arranged between the valve seat and the catcher for opening and closing at least one passage channel formed in the valve seat. At least one of the valve components formed as a valve seat, catcher or sealing element is produced at least in sections by additive manufacturing. The valve seat, the catcher and also the sealing element are therefore valve components, at least one of these valve components being produced at least in sections by additive manufacturing. At least one of the valve components formed as a valve seat or catcher has a plurality of passage channel limiting sections and a plurality of web portions, the passage channel limiting sections forming valve seat passage channels and/or catcher passage channels, wherein the passage channel limiting sections and the web portions each extend mutually at an angle $\alpha$, at least one of the passage channel limiting sections being dimensioned shorter in the direction of the longitudinal axis of the respective valve component than the web portions of the respective valve component in the direction of the longitudinal axis.

Advantageously, in the longitudinal axial direction, all the passage channel limiting sections of the valve seat and/or the catcher are dimensioned shorter than the web portions of the respective valve component. This reduces the length of the valve seat passage channels and/or the length of the catcher passage channels and therefore reduces the flow resistance and/or the dead space volume. In addition, the valve component can be manufactured with less material, so that it has a lower weight and can therefore be manufactured more cost-effectively and preferably also more quickly using additive manufacturing.

Advantageously, in the longitudinal axial direction, all the passage channel limiting sections of the valve seat are at least one quarter shorter than the web portions of the valve seat.

Advantageously, the web portions extend radially with respect to the longitudinal axis, with a plurality of passage channel limiting sections arranged mutually spaced in this radial direction and connected to the web portions, wherein in the longitudinal axial direction the length of the passage channel limiting sections decreases towards the longitudinal axis. Such a valve component has a particularly low flow resistance, and requires a reduced amount of material for manufacture.

Advantageously, the passage channel limiting section nearest to the longitudinal axis has a length in the longitudinal axial direction of at most half that of the web portion in the longitudinal axial direction. Such a valve component again exhibits a particularly low flow resistance, and requires a reduced amount of material for manufacture.

Advantageously, the web portions of the valve seat form part of a support structure, the web portions extending outwardly from a central section of the valve seat to an edge section and being connected thereto, the edge section forming an outer periphery of the valve seat and preferably being part of the support structure so that the passage channel limiting sections are held by the support structure, the support structure being integrally formed together with the passage channel limiting sections. This division of the valve seat into a support structure and a plurality of passage channel limiting sections held by the support structure has the advantage that the design of the passage channel limiting sections, e.g. the width in the radial direction and/or the height in the longitudinal direction, can be optimally reduced in such a way that the passage channel limiting sections are not damaged by the applied forces or can withstand them, and can thus be designed relatively thin. The forces acting on the passage channel limiting sections are dissipated via the support structure. Preferably, the outer circumference completely encloses the valve seat by extending through an angle of 360° in the circumferential direction relative to the longitudinal axis.

It may prove advantageous to arrange at least four, five or six web portions mutually spaced in the circumferential direction to the longitudinal axis, preferably mutually evenly spaced, so that the passage channel limiting sections are supported or held by the web portions at mutually regularly spaced connection points in the circumferential direction. Advantageously, seven, eight, nine or ten web portions are arranged mutually spaced apart, preferably mutually evenly spaced apart, to form a higher number of connecting points for the passage channel limiting sections. This design has the advantage that the passage channel limiting sections can be made thinner radially to the longitudinal axis, since a higher number of connecting points is available for force dissipation.

The use of additive manufacturing—also known as generative manufacturing—allows complex geometric structures to be created with very little effort. For example, a component with sufficiently high mechanical stability can be produced with only a small amount of material. This can ensure an overall high level of operational reliability. For example, the required mechanical stability can be achieved by selecting a suitable component geometry with only a small overall height. In particular, the use of additive manufacturing can reduce the overall height of the valve seat—i.e. in longitudinal axial extension—without any loss of stability.

A reduced overall height of the valve seat results in reduced dead space when used in piston compressors. The operating efficiency of the respective piston compressor can be improved in this way.

Finally, the use of additive manufacturing can promote a shortening of the passage channels in the longitudinal axial direction of the valve seat with only little effort. On the one hand, a shortening of the length of the passage channels in the longitudinal-axial direction results from a reduced overall height of the respective valve component—as mentioned above. On the other hand, the use of additive manufacturing processes can be used to form individual through-flow channels or through-flow channel limiting sections whose length in the longitudinal axial direction may be shorter than the overall height of the respective valve component, the overall overall height of the valve components preferably being determined by the overall height of the support structure or the web portions in the longitudinal direction. Overall, this allows flow resistance to be reduced and results in improved operating characteristics for the poppet valve. In addition, less material is required for production. Finally, the use of additive manufacturing makes it possible to increase the number of passages without additional expense and, in particular, to reduce the width of the valve seat passages or the width of the catcher passages radially to the longitudinal axis, thus further reducing flow resistance.

According to a preferred embodiment, a damping element can also be arranged between the sealing element and the catcher. Such a damping element can be used to damp or intercept movements of the sealing element in the direction of the catcher and decelerate them in a way that is gentle on the material. Such a damping element can also be produced by additive manufacturing.

In a preferred embodiment, at least one of the valve components formed as a valve seat, catcher, sealing element or damping element is produced entirely by additive manufacturing. In addition, the respective component may be subjected to post-processing. Likewise, it is possible that only one section of the respective valve component is generated by additive manufacturing and another section is generated by an alternative manufacturing process. The two differently generated component sections may, for example, be joined together. This results in great design and manufacturing flexibility. Thus, only complex geometric structures can be generated by additive manufacturing and simple structures can be generated by alternative manufacturing processes, such as other primary shaping, forming or machining manufacturing processes.

In a further advantageous embodiment, at least one of the valve components formed as a valve seat, catcher, sealing element or damping element is machined. For such mechanical machining, for example, machining and/or cutting manufacturing are possible. For example, the respective valve component can be produced at least in sections or completely by additive manufacturing and subsequently subjected to machining, whereby the advantages of additive manufacturing and machining can be combined in an advantageous manner.

Preferably, the valve seat and the catcher can be produced by the same manufacturing process or in sections by the same manufacturing process. This allows the manufacturing costs to be further reduced. In contrast, the sealing element and/or the damping element can be produced by a manufacturing process that differs from the manufacturing process for the valve seat and/or the catcher.

The sealing element can be made of a metal material or a plastic material. The sealing element can be manufactured either by an additive manufacturing process or by a cutting manufacturing process, such as stamping. If the sealing element is designed as a stamped part, it can be manufactured at low cost. In principle, stamping can be used for the sealing element, since the sealing element has only a small thickness or height. In contrast, complex geometric structures can also be provided for the manufacture of the sealing element when additive manufacturing is used. This applies regardless of whether the sealing element is made from a plastic material or from metal material. For example, by using additive manufacturing, the sealing element can be provided with form elements in the thickness or height direction which, in a closed position, engage in passage channels of the valve seat and thus ensure improved sealing.

According to an advantageous embodiment, at least one of the valve components formed as a valve seat, catcher, sealing element or damping element is produced at least in sections by manufacturing from a powdery, granular, malleable and/or liquid state, whereby a high degree of manufacturing flexibility can be ensured.

In a further advantageous embodiment, the respective valve components can in particular be made of metallic materials and/or plastic. In particular, the valve seat and catcher can be made of a metal material or also of plastic. The sealing element can likewise be made of a metallic material or of a plastic material. Finally, a damping element, if provided, can also be made of a metal material or of a plastic material.

It is also possible to produce the respective valve component using a fiber-reinforced material. The reinforcing fibers can be introduced into the respective component by additive manufacturing. In the case of plastic materials in particular, this can achieve a significant increase in strength.

According to a further preferred embodiment, at least one of the valve components formed as a valve seat, catcher, sealing element or damping element is produced at least in sections by selective laser melting, selective laser sintering (SLS) or electron beam melting. This allows components with large specific densities to be produced, thus ensuring high overall stability.

It is also possible to produce the respective valve component by selective heat sintering (English: selective heat sintering (SHS)), binder jetting, fused deposition modeling (English: fused deposition modeling (FDM)), stereolithography and/or 3D screen printing.

According to an advantageous embodiment, at least one of the valve components formed as a valve seat, catcher, sealing element, or damping element may be produced by a combination of the above manufacturing processes, further increasing manufacturing flexibility.

It can be further advantageous if at least one of the valve components designed as a valve seat or catcher has a plurality of passage channel limiting sections extending in the circumferential direction as well as a plurality of web portions which each extend mutually at an angle of greater than 0°, for example at 90° or, for example, transversely at 45°, one of the passage channel limiting sections being differently dimensioned and/or positioned in the longitudinal axial direction of the respective valve component than one of the web portions.

The dimensioning or positioning of the web portions can thus be selected independently of the dimensioning or positioning of the passage channel limiting sections. The web portions on the one hand and the passage channel limiting sections on the other can thus be specifically dimensioned or positioned in the longitudinal axial direction with regard to their respective functionality.

In an advantageous manner, the web portions can run at an angle, for example at 90° or 45°, to the outer circumference of the respective valve component. The web portions can preferably cross the passage channel limiting sections in plan view of the respective valve component—i.e. as seen in the height direction or in the longitudinal axial direction of the valve component.

In a particularly advantageous embodiment, the web portions can be arranged or run in a radial direction. In this case, the web portions can run between a central section of the respective valve component up to an edge section forming the outer circumference, preferably in a straight line. In this way, the web portions and the passage channel limiting sections can form an advantageous complement to each other. A continuous rectilinear web portion is capable of withstanding particularly large applied forces. For this purpose, the rectilinear web portion can also have a relatively small diameter, which reduces flow resistance.

The web portions can be formed integrally with the passage channel limiting sections, particularly preferably merging into one another. The web portions can support the passage channel limiting sections or form a support structure for the passage channel limiting sections. This makes it possible to design the web portions primarily with regard to sufficient mechanical strength and the passage channel limiting sections primarily with regard to further subdivision of the flow cross section of the respective valve component.

In a further preferred embodiment, at least one of the valve components designed as a valve seat, catcher, sealing element or damping element can be plate-shaped. Plate-shaped valve components can be arranged one above the other in an advantageous manner and thus ensure an overall compact structure, in particular for forming a so-called plate valve.

Further preferably, at least one of the valve components designed as a valve seat, catcher, sealing element or damping element, which is preferably plate-shaped, can have a circular, oval or elliptical outer circumference. Likewise, the outer circumference of the respective valve component can be polygonal, for example rectangular and/or square. It is therefore possible in principle for the length dimension transverse to the longitudinal axial direction and thus transverse to the component height and the width dimension transverse to the longitudinal axial direction and thus transverse to the component height to correspond to one another or also to differ from one another.

For example, a valve component with an elliptical outer circumferential shape has a greater length than width in plan view, and in the case of a circular outer circumferential shape, the length and width of the valve component are identical to each other in plan view. Outer circumferential shapes with a greater length than width transverse to the longitudinal axial direction allow larger flow cross sections to be realized, which means that lower flow resistance can be realized, particularly at the top dead center of a piston compressor.

Preferably, all valve components of the seat valve, in particular the valve seat, the catcher, the sealing element and, if applicable, also a provided damping element are geometrically matched to each other or have a correspondingly designed outer circumferential shape. The outer circumferential shape of the respective valve component can be formed by an edge section. The edge section can be a circumferential section, the shape of which corresponds to internal passage channel limiting sections or which has a different shape to internal passage channel limiting sections.

In a further preferred embodiment, the passage channel limiting sections may be circular, oval or elliptical. It is also possible for the passage channel limiting sections to form a polygonal, in particular rectangular or square shape in the direction of rotation. The course of the passage channel limiting sections is advantageously adapted to the shape of the outer circumference or edge section of the respective valve component or is designed accordingly.

In a particularly advantageous manner, the passage channel limiting sections of a valve component run concentrically to each other and/or have a constant distance to each other in the direction of rotation.

In a further advantageous embodiment, support surfaces for supporting the sealing element or a possibly provided damping element can be formed on the passage channel limiting sections. The support surfaces can thus be designed for interaction with a sealing element or a damping element. By contact of a sealing element with a support surface, a sealing closure of a passage channel can thus be achieved. It is also possible for the web portions to be free of contact surfaces. The web portions therefore do not have to be designed for direct contact with a sealing element or damping element. The web portions can thus primarily have a high toughness, whereas a particularly high hardness is not required.

It can be advantageous if one of the web portions on a side facing the sealing element or the damping element is recessed in the longitudinal axial direction of the respective valve component relative to one of the passage channel limiting sections. The respective sealing element or the respective damping element thus contacts support surfaces of the passage channel limiting sections and does not come into contact with the web portions.

Further preferably, at least one of the web portions can protrude on a side facing away from the sealing element or the damping element in the longitudinal axial direction of the respective valve component relative to one of the passage channel limiting sections. In this way, the respective web portion can particularly advantageously provide a supporting or load-bearing functionality for the respective passage channel limiting section.

Further preferably, at least one of the web portions may have a larger dimensioning in the longitudinal axial direction of the respective valve component than one of the passage channel limiting sections. For example, the web portions of the valve seat may have a larger dimensioning in the longitudinal axial direction of the valve seat than the passage channel limiting sections of the valve seat. Due to the larger dimensioning of the web portions in the longitudinal axial direction, a mechanically stable design can thus be achieved, whereas the passage channel limiting sections have a smaller dimensioning in the longitudinal axial direction and thus generate only a relatively small flow loss for the fluid flowing through.

According to a further embodiment, the different passage channel limiting sections may have different dimensions in the longitudinal axial direction.

For example, inboard passage channel limiting sections may have a smaller extension in the longitudinal axial direction than outboard passage channel limiting sections. In particular, the extent of the passage channel limiting sections may gradually increase in the longitudinal axial direction from an inboard passage channel limiting section to a more outboard passage channel limiting section. Thus, the most inwardly disposed passage channel limiting section may have the smallest extension in the longitudinal axial direction, and the most outwardly disposed passage channel limiting section may have the largest extension in the longitudinal axial direction. The most outwardly arranged passage channel limiting section can in particular be an edge section.

Further preferably, the at least one passageway of the valve seat can be formed between two adjacent passageway limiting sections. In this case, the passage channel can have a fluid-mechanically adapted shape in the longitudinal axial direction of the valve seat. The shape of the passage channel can thus be selected with regard to fluid-mechanically favorable properties, in particular with regard to low flow resistance or to promote laminar or turbulence-free flow.

Accordingly, the catcher may also have a passage channel formed between two adjacent passage channel limiting sections and having a fluid mechanically adapted shape in the longitudinal axial direction of the catcher. The fluid-mechanically adapted shape of the passage channel in the catcher can also be selected with regard to favorable fluid-mechanical properties.

According to a further advantageous embodiment, at least one of the valve components designed as a valve seat or catcher can have a plurality of passage channels arranged concentrically to one another. The at least one passage channel or the plurality of passage channels can be designed in a groove-like manner in an advantageous manner.

In an advantageous manner, between 3 and 20, preferably between 5 and 10, passage channels or corresponding passage channel limiting sections arranged concentrically to one another in the radial direction can be provided in the respective valve component, which can be designed as a valve seat, catcher, sealing element or damping element. The flow resistance can be further reduced by a higher number of passage channels per valve component.

In a further preferred manner, at least one passageway can be interrupted in sections in the circumferential direction by at least one web portion. By sectional interruption is meant here an interruption that does not extend along the entire longitudinal axial extent of the passage channel. Thus, the sections of a passage channel distributed in the direction of circulation remain in fluid communication with one another—even when the sealing element or the respective damping element is in contact with a bearing surface of the respective valve component. On the one hand, this makes it possible to achieve a high degree of stability without significantly impairing the flow properties of the respective passage channel.

In a further preferred embodiment, the passage channels of the respective valve component can have a width in the radial direction of 2 to 10 mm, 3 to 10 mm, preferably 4 to 8 mm and particularly preferably 6 to 7 mm or 2 to 3 mm. The width of the respective passage channel can have a minimum of 3 to 4 mm and a maximum of 8 to 10 mm. Preferably, all the passage channels of the respective valve component have such width dimensions. Particularly preferably, all passage channels have the same width dimensions.

In a further preferred embodiment, the at least one passage channel of the catcher can guide a fluid flowing therethrough in the direction of a longitudinal axis extending through the center of the catcher. For this purpose, the at least one passage channel of the catcher can be inclined or curved in longitudinal section relative to the longitudinal axis of the catcher. By inclination or curvature, the mean longitudinal section course of the passage channel can be meant. Such a design can be used to specifically influence the flow behavior of the fluid flowing through after leaving the poppet valve. The flow behavior inside or outside a piston compressor can be improved in this way.

Further preferably, at least one passage channel can be defined by surfaces of adjacent passage channel limiting sections, which have a shape that changes at least in sections in the longitudinal axial direction of the respective valve component. Such a changing shape of surfaces can advantageously influence the fluid-mechanical properties. The surfaces can have curvatures in the longitudinal axial direction, be inclined relative to the longitudinal axial direction of the valve component or be designed as free-form surfaces overall. Shapes of this kind can be selected as a result of fluid mechanical modeling and can be formed in the respective valve component with only little effort through the use of additive manufacturing.

In a further preferred embodiment, at least one of the passage channel limiting sections may have a cross-sectional shape that tapers in the longitudinal axial direction of the respective valve component in an orientation away from the sealing element or the damping element. Such an embodiment may be considered for both the valve seat and the catcher. In such an embodiment, the valve seat can assume the function of a nozzle and the catcher can fulfill the function of a diffuser. This is due in particular to the fact that a corresponding taper of the passage channel limiting sections in the longitudinal axial direction is also accompanied by an enlargement or widening of the passage channels in an orientation facing away from the sealing element or damping element.

According to a further embodiment of the seat valve according to the invention, at least one of the web portions can have a shape that changes in the longitudinal axial direction of the respective valve component. In this context, it is also possible for the respective web portion to have a fluid-mechanically adapted shape. Since the passage channels can be interrupted in sections by a web portion, a further reduction in flow resistance can be ensured by a fluid-mechanically adapted shape of the web portions. Likewise, in a part of the web portions that protrudes with respect to the passage channel limiting sections, a flow-favoring shape of the web portions can contribute to improving the properties of the poppet valve.

According to a further embodiment, at least one of the web portions can have a shape that changes in its longitudinal direction—for example in a radial direction of the respective valve component. The web portion can have a shape that tapers and/or widens in sections in its longitudinal direction. For example, such a web portion can initially taper from a central section of the respective valve component and then widen again before transitioning into an edge section of the valve component. This results in a material-saving structure with good mechanical properties at the same time. In particular, undesirable stress peaks during operation of the valve component can be avoided in this way.

According to a further preferred embodiment, a plurality of the web portions, in particular more than two web portions, can extend from a central section of the respective valve component to an edge section defining the outer circumference of the respective valve component. By a central section is meant here a material section of the valve component which delimits a through hole via which a screw connection of the valve components can be made. Preferably, two oppositely arranged web portions can run along a continuous line. The oppositely arranged web portions can be connected to one another by a central section. The respective valve component, in particular the valve seat or catcher, can preferably be of mirror-symmetrical design.

Further preferably, at least one of the valve components designed as a valve seat or catcher can have rounded end faces or rounded edges on a side facing away from the closing element or damping element, as a result of which the risk of turbulence of the fluid flowing through can be further reduced. Such rounded end surfaces are formed in a particularly advantageous manner on the passage channel limiting sections and/or the web portions.

Another aspect of the present invention relates to a poppet valve, which is preferably a plate valve, having a valve seat, a catcher arranged at a distance from the valve seat, at least one sealing element arranged movably between the valve seat and the catcher for opening and closing at least one passage channel formed in the valve seat, and at least one damping element arranged between the sealing element and the catcher for damping movements of the sealing element in the direction of the catcher. At least one of the valve components formed as a valve seat, catcher, sealing element or damping element is produced at least in sections by additive manufacturing. The valve seat, the catcher, the sealing element and also the damping element are therefore valve components and according to the present aspect of the invention at least one of these valve components is produced at least in sections by additive manufacturing.

Another aspect of the present invention relates to a valve component, preferably for a seat valve described above, which is preferably a plate valve. Advantageously, the valve component according to the present invention is a valve seat or a catcher. Likewise, the valve component may be and a sealing element or a damping element. The valve component according to the invention has a passage channel which is delimited by at least one wall section. According to the invention, the wall section is produced by additive manufacturing. In this way, wall sections with overall complex geometric shapes can be produced, so that on the one hand favorable flow properties and at the same time also a high degree of stability can be ensured.

Another aspect of the present invention relates to a piston compressor having at least one poppet valve described above and/or having a valve component described above.

The above statements on the possible designs or different aspects of a poppet valve according to the invention also apply accordingly to the valve component according to the invention and also to a piston compressor according to the invention.

According to the invention, the method of manufacturing valve components of a poppet valve, the valve components comprising at least one of a valve seat and a catcher, is performed by additive manufacturing a support structure comprising a plurality of web portions, by additive manufacturing also a plurality of passage channel limiting sections connected to the web portions are generated, wherein the passage channel limiting sections are arranged such that valve seat passage channels and/or catcher passage channels are formed between the passage channel limiting sections, and that at least one of the passage channel limiting sections is dimensioned shorter in the direction of the longitudinal axis than one of the web portions of the respective valve component in the longitudinal axial direction.

Vorzugsweise werden in Richtung der Längsachse alle Durchlasskanalbegrenzungsabschnitte des Ventilsitzes und/oder des Fängers kürzer dimensioniert als die Stegabschnitte der jeweiligen Ventilkomponente in längsaxialer Richtung.

Advantageously, in the direction of the longitudinal axis, the passage channel limiting sections of the valve seat are formed at least one quarter shorter than the web portions of the valve seat in the longitudinal axial direction.

Advantageously, the web portions are formed extending radially with respect to the longitudinal axis, wherein a plurality of passage channel limiting sections are arranged spaced apart from each other in the radial direction with respect to the longitudinal axis and are connected to the web portions, and wherein in the longitudinal axial direction the passage channel limiting sections are formed with decreasing length towards the longitudinal axis.

Advantageously, in the longitudinal axial direction, the passage channel limiting section closest to the longitudinal axis is formed with a length of at most half the length of the web portion in the longitudinal direction.

The present invention is explained in more detail below with reference to advantageous embodiments and the accompanying drawings:

BRIEF DESCRIPTION OF THE DRAWINGS

The drawings used to explain the embodiments show.

Generally, the same parts are given the same reference signs in the drawings.

WAYS TO CARRY OUT THE INVENTION

Figure 1:
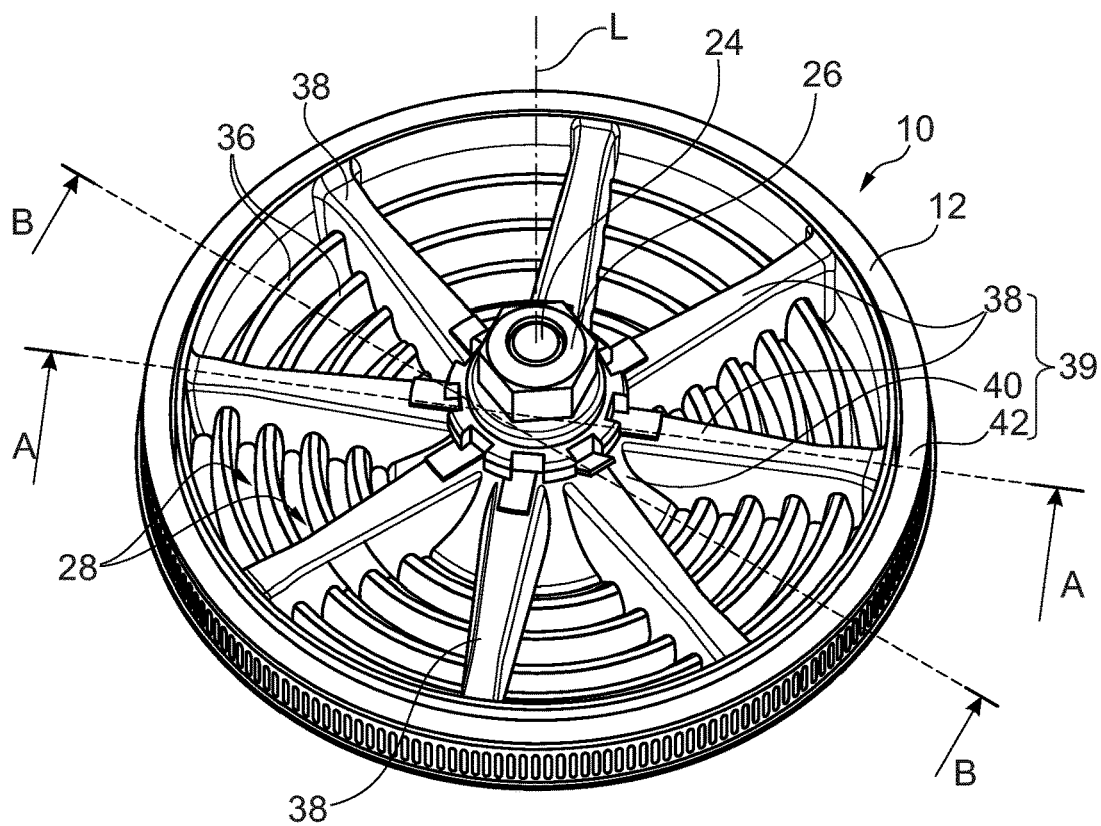
FIG. 1 a perspective view of a poppet valve according to the invention from an inflow side.
Figure 2:
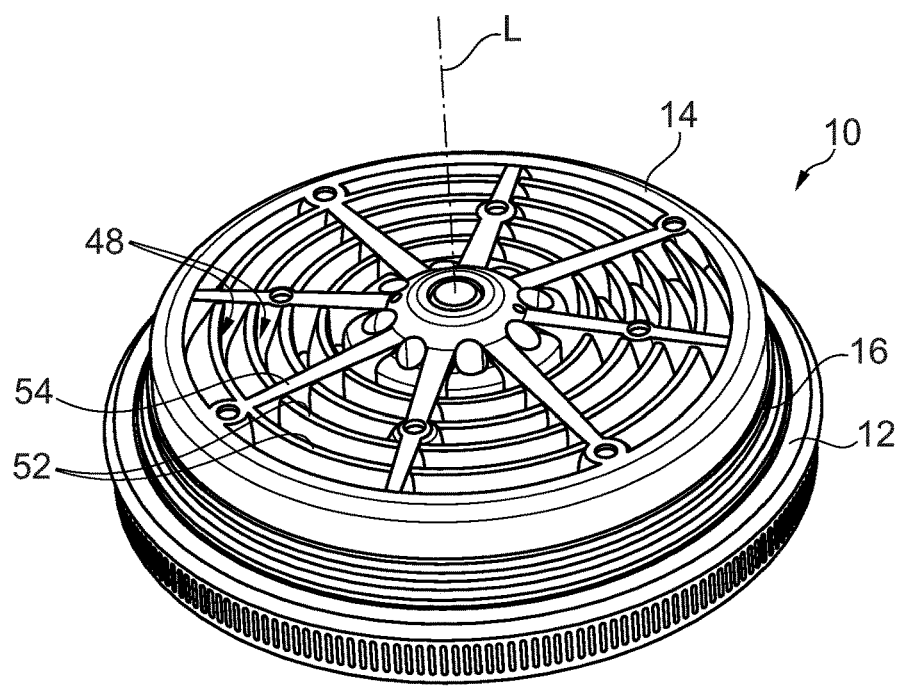
FIG. 2 a perspective view of the poppet valve of FIG. 1 from an opposite outflow side.
Figure 3:
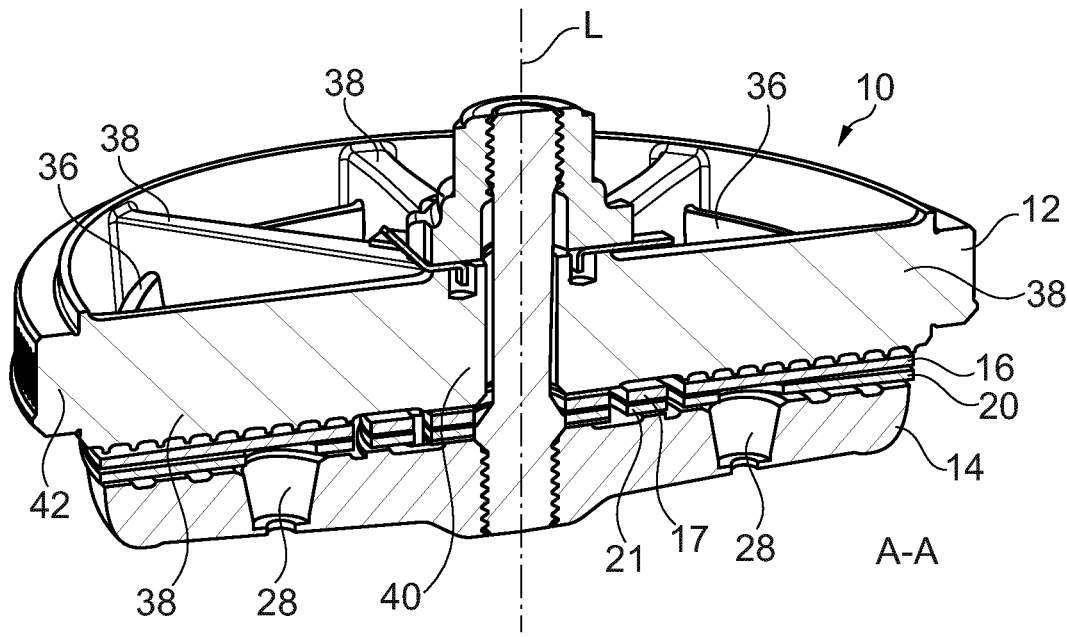
FIG. 3 a sectional view of the poppet valve of FIG. 1 along a sectional plane A-A.
Figure 4:
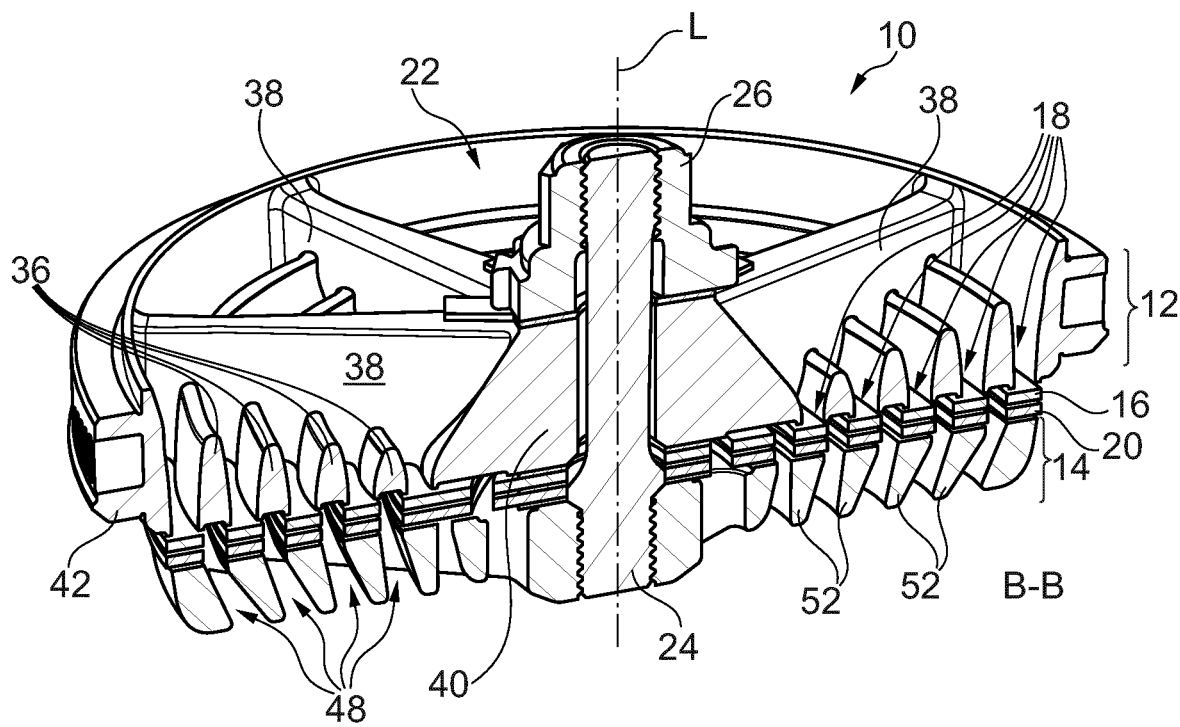
FIG. 4 a sectional view of the poppet valve of FIG. 1 along a sectional plane B-B.

FIGS. 1 and 2 show perspective views of a seat valve 10 according to the invention, and FIGS. 3 and 4 show sectional views of the seat valve 10 along different planes. In particular, FIG. 3 shows a sectional view of the poppet valve 10 of FIG. 1 along plane A-A and FIG. 4 shows a sectional view of the poppet valve of FIG. 1 along plane B-B.

The poppet valve 10 has a longitudinal axis L that extends in a longitudinal axial direction or in a height direction of the poppet valve 10.

As can be seen from FIGS. 1 to 4, the poppet valve 10 includes a valve seat 12, a catcher 14 spaced from the valve seat 12, and a sealing element 16 disposed between the valve seat 12 and the catcher 14. The sealing element 16 can be moved to open and close a passage channel 18 formed in the valve seat 12 between the valve seat 12 and the catcher 14. In particular, the sealing element 16 can be moved away from the valve seat 12 to open a passage channel 18 and can be moved toward or come into contact with the valve seat 12 to close a passage channel 18. The opening and closing movements of the sealing element 16 take place in the longitudinal axial direction along the longitudinal axis L.

As can be seen in particular from the sectional views in FIGS. 3 and 4, a damping element 20 can further be provided between the sealing element 16 and the catcher 14. The damping element 20 can dampen an opening movement of the sealing element 16 and thereby reduce wear phenomena. Likewise, it is possible that the sealing element 16 itself has damping properties and thus a separate damping element can be dispensed with.

As can be further seen from FIGS. 1 to 4, the valve components of the poppet valve 10 may be screwed together via a screw connection 22. Thus, a threaded bolt 24 may be screwed into the catcher 14 and, on the other hand, project through the steam element 20, the sealing element 16 as well as the valve seat 12. The threaded bolt 24 thus extends in particular in the longitudinal axial direction along the longitudinal axis L. On the side of the valve seat 12, a fastening nut 26 can in turn be screwed onto the threaded bolt 24. The required distance between the valve seat 12 and the catcher 14 can be maintained by using spacer elements.

According to the invention, at least one of the valve components formed as a valve seat 12, catcher 14 or sealing element 16 is now produced at least in sections by additive manufacturing. In particular, the respective valve component can also be produced completely by additive manufacturing. If a damping element 20 is also provided, this can also be produced by additive manufacturing.

By using additive manufacturing, in particular selective laser melting or selective laser sintering, complex geometric structures can be created with very little effort. In this way, the respective valve components can be designed with regard to both favorable fluid mechanical properties and stability requirements. In addition to selective laser melting or selective laser sintering, other additive or generative manufacturing processes can also be used to produce the valve components in question. These include, for example, selective heat sintering, binder jetting, electron beam melting, fused deposition modeling, stereolithography and/or the 3D screen printing process.

The use of additive manufacturing processes can also be advantageously combined with mechanical manufacturing processes, in particular machining processes. In this way, both additive manufacturing and machining manufacturing can be carried out in just one workpiece clamping. This allows valve components to be produced with particularly high precision.

The sealing element 16 can be preloaded in an orientation facing the valve seat 12. Spring elements not shown in more detail here can be provided for this purpose. Such spring elements can be arranged in particular in recesses 28 of the catcher 14, as can be seen, for example, in FIG. 3.

Figure 5:
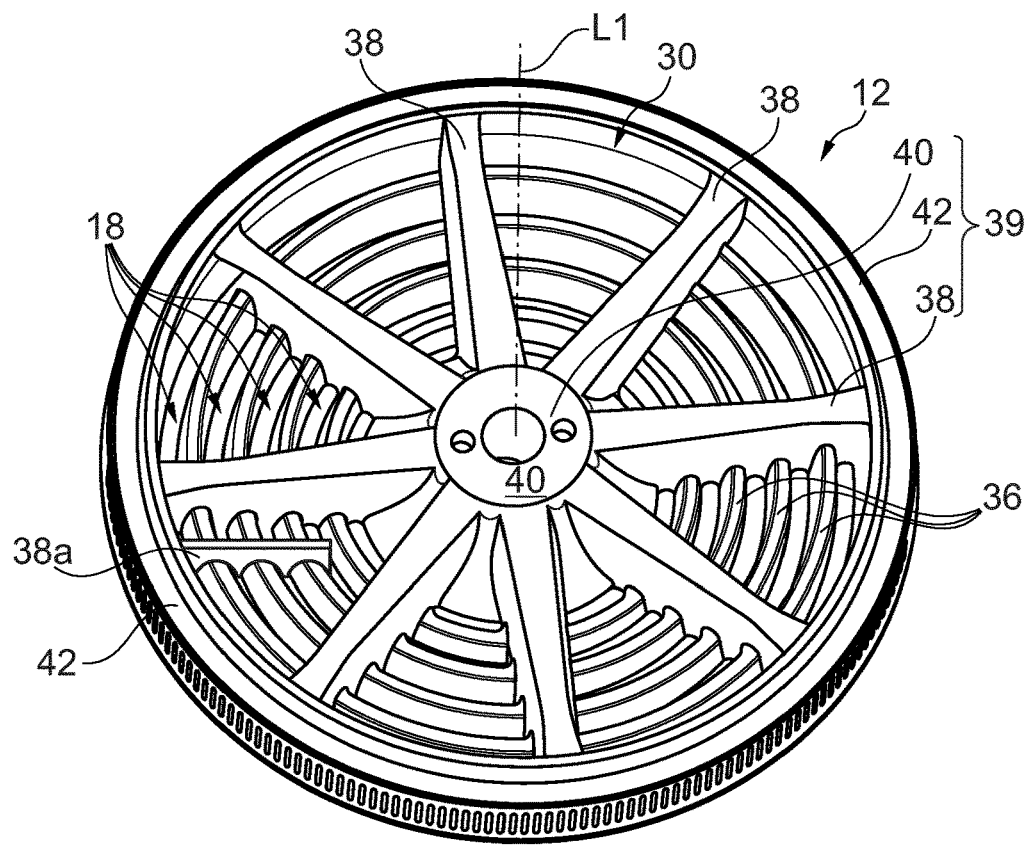
FIG. 5 a perspective view of a valve seat from an external inflow side.
Figure 6:
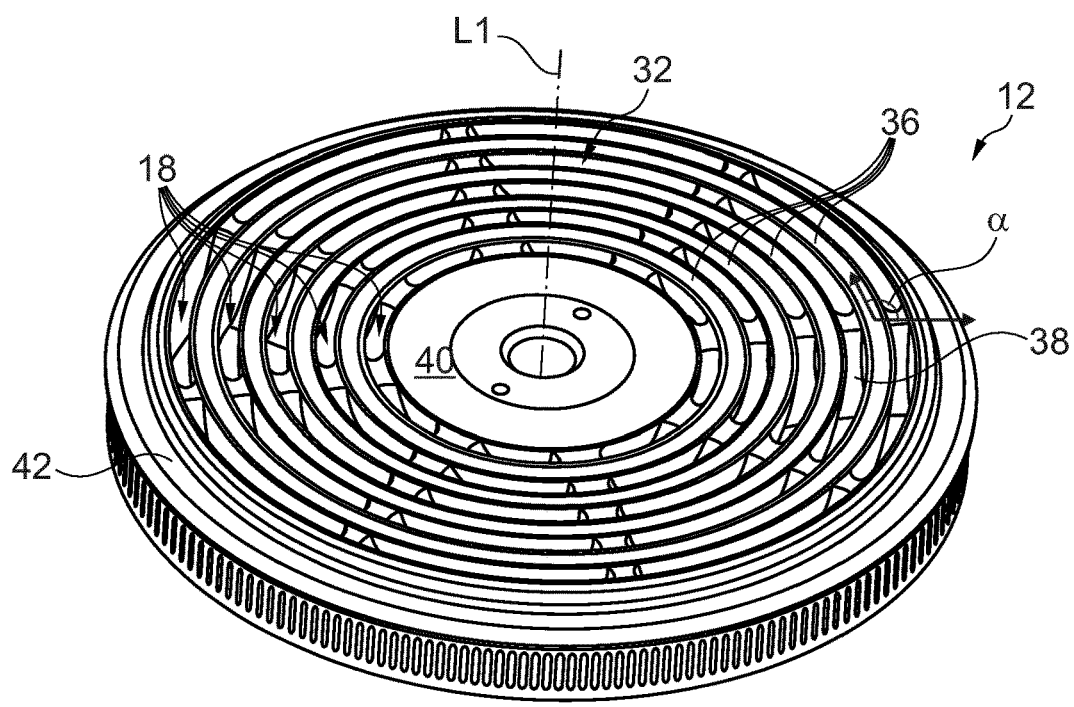
FIG. 6 a perspective view of a valve seat from an internal outflow side.

FIGS. 5 and 6 show perspective views of the valve seat 12, with FIG. 5 showing the valve seat 12 from an outer inflow side 30 and FIG. 6 from an inner outflow side 32. The inflow side 30 is therefore an outer side, which is on the outside when the poppet valve 10 is assembled. The outflow side 32 is an inner side that lies inside the valve when the poppet valve 10 is assembled.

It can be seen from FIGS. 5 and 6 that the valve seat 12 is provided with a plurality of passage channels 18. In particular, five passage channels 18 may be provided. The passage channels 18 may be arranged concentrically to each other and distributed in a radial direction of the valve seat 12. The radial direction thereby extends transversely to a longitudinal axial direction along a longitudinal axis L or L1 of the valve seat 12. The longitudinal axis L1 of the valve seat 12 coincides with the longitudinal axis L of the assembled seat valve 10.

In the embodiment example according to FIGS. 5 and 6, a total of five passage channels 18, arranged concentrically with respect to one another, are provided. However, it is also conceivable to provide a different number of passage channels, for example more than five, in particular up to ten or more than ten passage channels 18 distributed in the radial direction and arranged at a distance from one another.

It can further be seen from FIGS. 5 and 6 that the passage channels 18 are each bounded by adjacently arranged passage channel limiting sections 36. In particular, the passage channel limiting sections 36 extend in a circumferential direction around the longitudinal axis L1. According to FIGS. 5 and 6, the passage channel limiting sections 36 may in particular extend in a circular manner, so that the passage channels 18 also extend in a circular manner around the longitudinal axis L1.

As shown in FIG. 5, it may also prove advantageous to provide additional partial web portions 38a that do not extend in the radial direction along the entire width between edge section 42 and center section 40, but only over a partial width. FIG. 5 shows only a single partial web portion 38a as an example. Preferably, such partial web portions 38a are arranged mutually regularly spaced apart in the circumferential direction. Advantageously, the partial web portions 38a are connected to the edge section 42 and extend from the latter in a radial direction or in a direction transverse to the radial direction. Moreover, such partial web portions 38a may also be arranged in the catcher 14.

The valve seat 12 may further include a plurality of web portions 38. The web portions may intersect the passage channel limiting sections 36 at an angle α, thereby forming a support or bearing structure 39 for the passage channel limiting sections 36. In this regard, the web portions 38 may extend radially outward from a central section 40 of the valve seat with respect to the longitudinal axis L1 to an edge section 42. The edge section 42 may form an outer circumference of the valve seat 12 and preferably extends 360° in the circumferential direction with respect to the longitudinal axis L1. The web portions 38 and the passage channel limiting sections 36 intersect at an angle α of 90°, as shown. However, the web portions 38 could also cross transversely with respect to the passage channel limiting sections 36 and this thus at an angle α in the range of, for example, 30° and 150°, as shown, for example, in FIGS. 11 and 12.

Advantageously, the center section 40, the web portions 38, and the edge section 42 together form a stable support or bearing structure 39 for the passage channel limiting sections 36.

The web portions 38 can, in particular, be designed as spokes or spoke-shaped. The web portions 38 can interrupt the passage channels 18 in sections in a circumferential direction.

A passage channel 18 can thus have several channel sections arranged in the direction of circulation, which are subdivided by the web portions 38. Due to the fact that the passage channels 18 are only subdivided in sections by the web portions 38, fluid communication can also exist between the individual channel sections when the respective passage channel 18 is closed by the sealing element 16. For this purpose, the web portions 38 can project back in the longitudinal axial direction along the longitudinal axis L1 relative to the passage channel limiting sections 36 on an outflow side facing the sealing element 16. Thus, the passage channel limiting sections 36 form support surfaces for the sealing element, whereas the web portions 38 are free of such support surfaces. The sealing element 16 can thus not come into direct contact with the web portions 38.

It can further be seen from FIG. 5 that on an inflow side of the valve seat 12 facing away from the sealing element 16, the web portions 38 protrude in a longitudinal axial direction relative to the passage channel limiting sections 36. On the inflow side 30 of the valve seat 12, the web portions 38 thus extend further in a longitudinal axial direction along the longitudinal axis L1 than the passage channel limiting sections 36. The web portions 38 thus form a particularly advantageous support functionality or support structure 39 for the passage channel limiting sections 36. Advantageously, the support structure 39 comprises all web portions 38 as well as the center section 40 and the edge section 42.

The web portions 38 may have an overall greater extension in the longitudinal axial direction along the longitudinal axis L1 than the passage channel limiting sections 36. That is, the passage channel limiting sections 36 are shorter in dimension in the direction of the longitudinal axis L1 than the web portions 38 in the longitudinal axial direction along the longitudinal axis L1. Furthermore, the passage channel limiting sections 36 may be differently dimensioned in the longitudinal axial direction along the longitudinal axis L1, as shown in particular in FIG. 4. Passage channel limiting sections 36 arranged further inwardly, i.e. passage channel limiting sections 36 lying closer to the central section 40 or the longitudinal axis L1, may be shorter in the longitudinal axial direction along the longitudinal axis L1 than passage channel limiting sections 36 arranged further outwardly, i.e. passage channel limiting sections 36 lying closer to the edge section 42. The longitudinal axial dimensioning of the passage channel limiting sections 36 may also increase stepwise starting from the central section 40 to the edge section 42. Advantageously, the passage channel limiting sections 36 of the valve seat 12 are at least a quarter shorter in the longitudinal axial direction than the web portions 38 of the valve seat 12 in the longitudinal axial direction. Advantageously, the passage channel limiting section 36 closest to the longitudinal axis L has a length in the longitudinal axial direction of at most half the length of the web portion 38 in the longitudinal axial direction.

As can be seen from FIGS. 5 and 6 and also from the sectional view in FIG. 4, the passage channels 18 have a fluid-mechanically adapted shape. For this purpose, the surfaces of the passage channel limiting sections, which limit the respective passage channels 18, can have a shape that changes in the longitudinal axial direction along the longitudinal axis L1. The respective surfaces can, for example, be curved in the longitudinal axial direction or formed as free-form surfaces.

In FIG. 4, it can be seen that the cross-sectional shape of a passage channel limiting section 36 tapers towards the inflow side 30 or in an orientation facing away from the sealing element 16. In addition, the surfaces or end edges facing the inflow side 30 can be rounded, so that there is only a low risk of turbulence for inflowing fluid. A corresponding fluid-mechanically adapted shape can also be provided for the web portions 38. The web portions 38 also define the passage channels 18, at least in sections. In addition, fluid is also guided past the web portions 38 outside the passage channels 18, namely in a region of the web portions 38 projecting on the inflow side 30 of the valve seat 12 relative to the passage channel limiting sections 36. Thus, the surface portions of the web portions 38 projecting with respect to the passage channel limiting sections 36 may also be rounded or curved or formed as free-form surfaces.

A shaping described above is favored or simplified in a particularly advantageous manner by additive manufacturing. In addition, the number of passages required or desired in each case can be increased without significant additional effort in production, in particular without increasing the processing times—for example through additional time-consuming machining operations.

Figure 7:
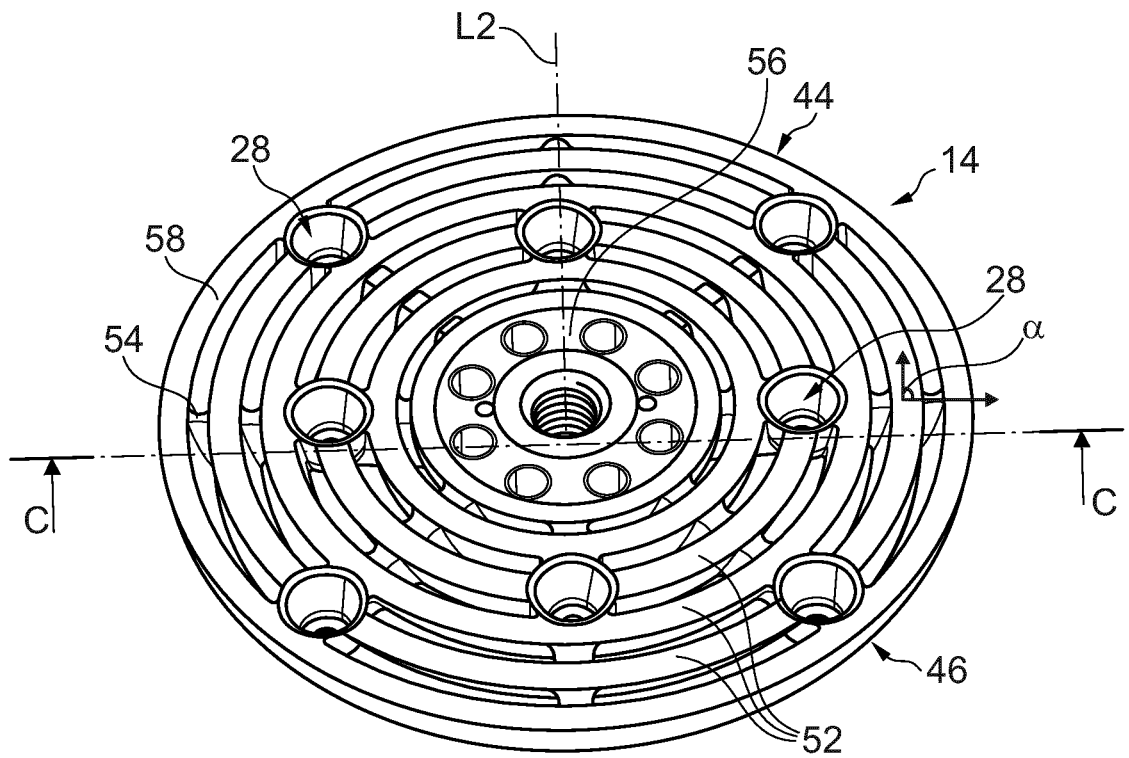
FIG. 7 a perspective view of a catcher from an inside inflow side.
Figure 8:
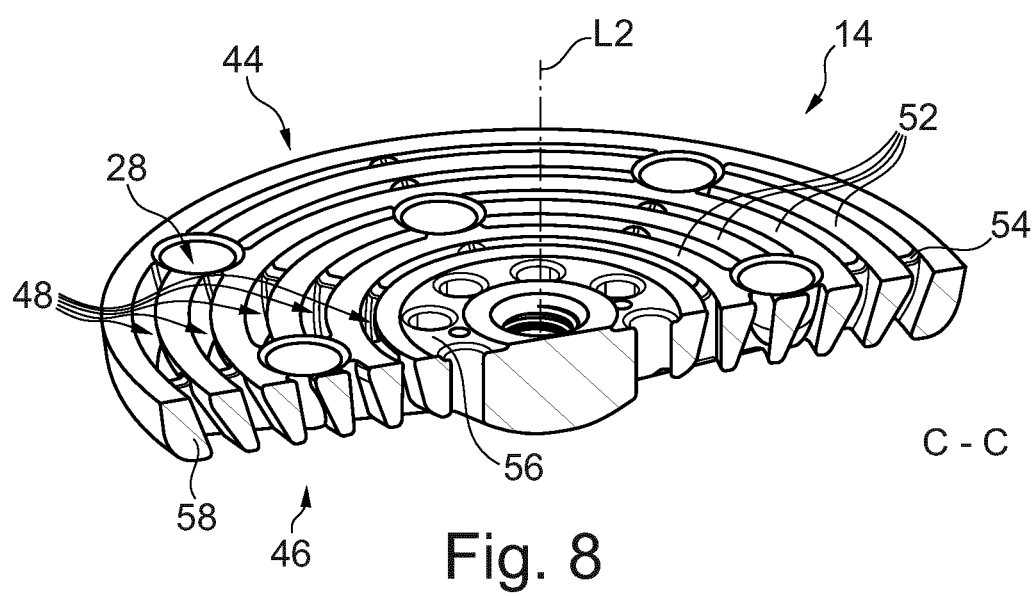
FIG. 8 a perspective sectional view of the catcher of FIG. 7 along a sectional plane C-C.
Figure 9:
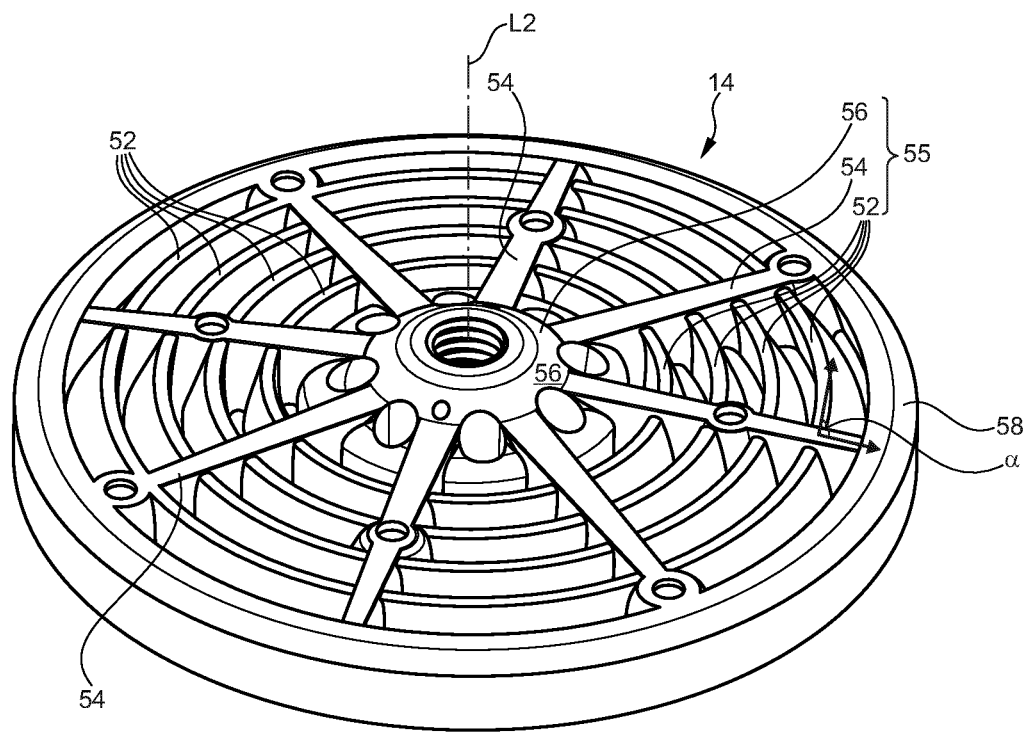
FIG. 9 a perspective view of the catcher of FIG. 7 from an external discharge side.

FIGS. 7, 8 and 9 show perspective views of a catcher 14, with FIG. 8 showing a sectional view along the plane C-C in FIG. 7. Here, FIG. 7 shows the inner inflow side 44, which faces the sealing element 16 or the damping element 20 in the assembled state of the poppet valve 10. The side of the catcher 14 opposite the inflow side 44, as shown in FIG. 9, is an outflow side 46 that is on the outside in the assembled state of the poppet valve 10.

The catcher 14 has a plurality of passage channels 48, in particular five passage channels 48 arranged concentrically with respect to one another. A different number of passage channels 48 may also be provided in the catcher 14, for example more than five, in particular up to ten or more than ten passage channels.

The passage channels 48 are arranged in a radial direction distributed with respect to each other. All of the web portions 54 may extend in a radial direction either perpendicularly or at an angle to the longitudinal axial direction of the longitudinal axis L2 of the catcher 14. In the assembled state of the poppet valve 10, the longitudinal axis L2 coincides with the longitudinal axis L or with the longitudinal axis L1 of the valve seat 12. The web portions 54 form a support structure 55, advantageously comprising all of the web portions 54 as well as the central section 56 and the edge section 58.

The passage channels 48 may be bounded by adjacently disposed passage channel limiting sections 52. Accordingly, the passage channel limiting sections 52 may extend in a circumferential direction about the longitudinal axis L2. In particular, the passage channel limiting sections 52 may form a circular shape.

The catcher 14 may further comprise a plurality of web portions 54 extending at an angle α to the direction of rotation, particularly in the radial direction. The web portions 54 may thereby extend in a radial direction from a central section 56 to an edge section 58, thereby crossing the passage channel limiting sections 52. The web portions 54 extend at an angle α with respect to the passage channel limiting sections 52, in the example shown at 90°. This allows the web portions 54, preferably together with the center section 56 and the edge section 58, to in turn form a support structure for the passage channel limiting sections 52.

Support surfaces 60 for the damping element 20 may be formed on the passage channel limiting sections 52. If no damping element is provided, the support surfaces 16 can be formed for supporting the sealing element 16. The receptacles 28 for the defect elements can advantageously be formed in the region of a web portion 54, so that a sufficiently stable support structure is provided for the spring elements not shown here. The web portions 54 can be free of contact surfaces for the damping element 20 or the sealing element 16. For this purpose, the web portions 54 on the inflow side 44 can project back in the longitudinal axial direction along the longitudinal axis L2 relative to the passage channel limiting sections 52.

The passage channels 48 can also be fluid-mechanically adapted in the case of the catcher 14. For this purpose, the surfaces of the passage channel limiting sections 52, which bound the passage channels 48, can have a shape that changes in the longitudinal axial direction along the longitudinal axis L2, for example curvatures, inclinations and/or geometries formed as free-form surfaces. Likewise, corresponding surface shapes can be provided at the web portions 54.

In a particularly preferred embodiment, the passage channels 48 may direct a fluid flowing therethrough in the direction of the longitudinal axis L2. For this purpose, a cross-section of a passage channel can be inclined and/or curved relative to the longitudinal axis L2 of the catcher 14, as can be seen in FIG. 4 or 8. Such an inclination and/or curvature—as seen in longitudinal section of the respective passage channel 48—may cause such a feed in the direction of the longitudinal axis L2.

Preferably, the passage channel limiting sections 52 are shorter in dimension in the direction of the longitudinal axis L2 than the web portions 54 in the longitudinal axial direction along the longitudinal axis L1, in particular in that, as shown in FIG. 9, the web portions 54 project in the longitudinal axial direction beyond the passage channel limiting sections 52.

Figure 10:
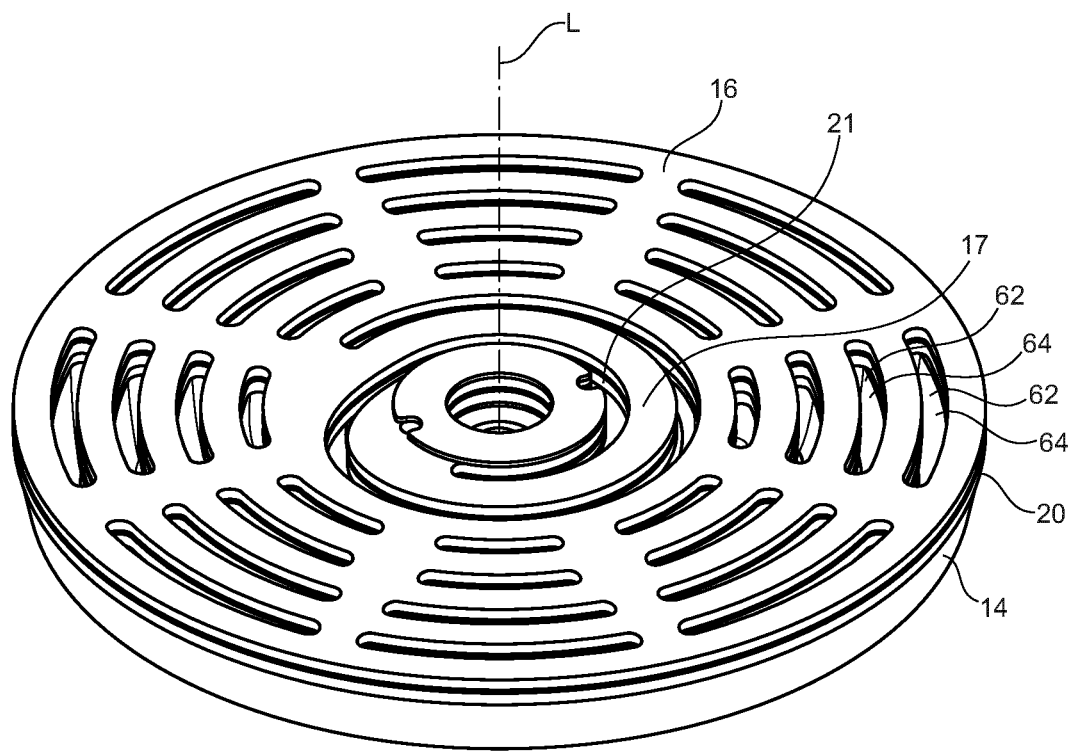
FIG. 10 a perspective view of the catcher of FIG. 7 in assembled position with a closing element and a damping element.

FIG. 10 shows a view of the sealing element 16 with the damping element 20 below it and the catcher 14 arranged below the damping element 20. The sealing element 16 is held by a spring section 17 and the damping element 20 by a spring section 21. It can be seen that the sealing element 16 is provided with through holes 62 which run in the direction of rotation. A fluid flowing out of the valve seat 12 can be passed through these through holes 62. For this purpose, the steam element 20 may also be provided with through holes 64 which are substantially aligned with the through holes 62 of the sealing element. The through holes 62 as well as 64 are also substantially aligned with the passage channels 48 of the catcher 14.

FIGS. 1 to 10 relate to an embodiment of a poppet valve with a circular outer circumference and with passage channel limiting sections 36 and 52, respectively, which extend circularly around a longitudinal axis L of the poppet valve 10 and around longitudinal axes L1 or L2 of the respective valve component, respectively.

It is also conceivable that the poppet valve 10 has an oval or elliptical or even a rectangular outer circumferential shape. In this case, the passage channel limiting sections can be adapted to such outer circumferential shapes or correspond to the respective outer circumferential shape. Thus, in the case of oval or elliptical outer peripheral shapes, the poppet valve 10 may have a length dimension and a width dimension transverse to the longitudinal axial direction along the longitudinal axis L, the length dimension being larger than the respective width dimension. The area through which a fluid can flow through the passage channels 18 can be increased in this way. Such a poppet valve can have a lower flow resistance when used in a piston compressor for top dead center.

Figure 11:
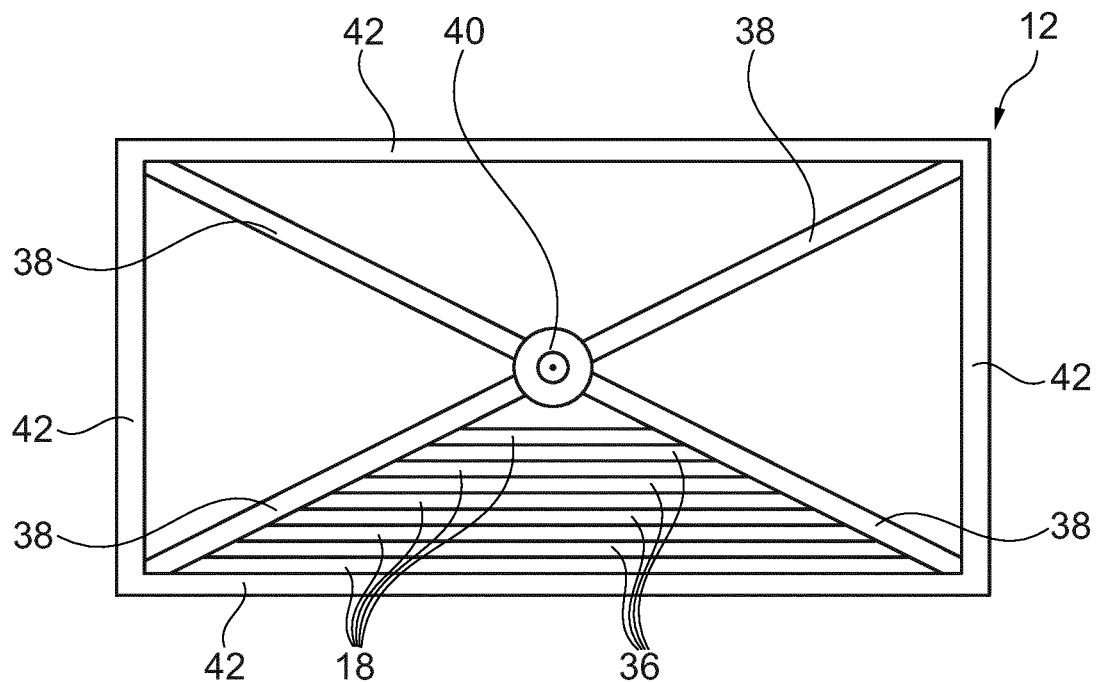
FIG. 11 a top view of a further embodiment of a valve seat.
Figure 12:
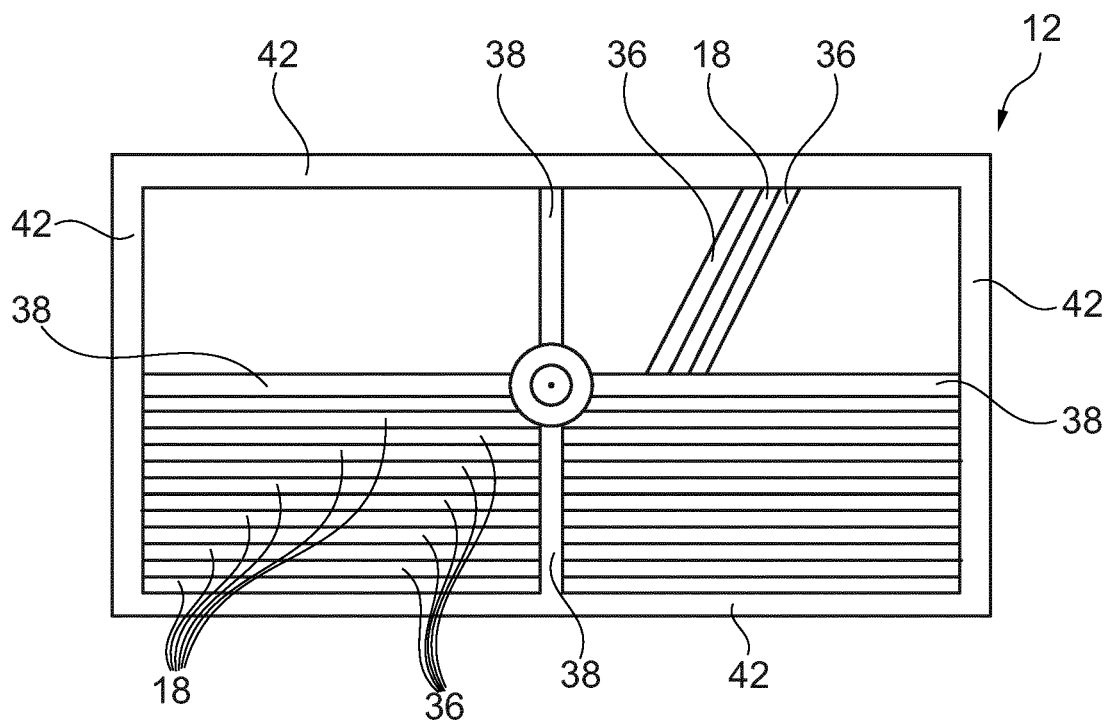
FIG. 12 a top view of a further embodiment of a valve seat.

FIGS. 11 and 12 show two further embodiments of a valve seat 12 having a support structure comprising a center section 40, a edge section 42, and web portions 38. The support structure carries passage channel limiting sections 36, between each of which is a passage channel 18. In FIGS. 11 and 12, only the lower panel shows the passage channel limiting sections 36, although of course the remaining panels shown blank also have such passage channel limiting sections 36 and associated passage channels 18. In FIG. 12, in the upper right field, yet another variant for the arrangement of passage channel limiting sections 36 is exemplarily shown, which forms a passage channel 18, whereby preferably the entire area of the upper right field could have passage channel limiting sections 36 could have. A catcher 14 could also be configured in this manner. Advantageously, the valve seat 12 and/or catcher 14 according to the invention comprises a support structure as well as a plurality of passage channel limiting sections 36. This subdivision into support structure and passage channel limiting sections 36 allows the passage channel limiting sections 36 to be arranged in a plurality of geometric shapes with respect to the support structure, so that the embodiments illustrated in FIGS. 11 and 12 represent only examples from a plurality of possible embodiments.

The use of additive manufacturing for at least one of the valve components of the poppet valve 10 can result in both advantages with regard to fluid mechanics without significantly increasing the manufacturing effort. At the same time, sufficient mechanical stability of the respective valve components can be ensured. In addition, the use of additive manufacturing enables material savings, since machining of the respective component can be avoided or reduced to a lesser extent.

A method of manufacturing valve components of the poppet valve 10, the valve components comprising at least one of a valve seat 12 and a catcher 14, is performed by additive manufacturing to generate a support structure 39,55 comprising a plurality of web portions 38,54, by additive manufacturing also creating a plurality of passage channels limiting sections 36,52 connected to the web portions 38,54, the passage channel limiting sections 36,52 being arranged such that valve seat passage channels 18 and/or catcher passage channels 48 are formed between the passage channel limiting sections 36,52.

The invention claimed is:

1. A poppet valve with a longitudinal axis (L), with a valve seat having a plurality of valve seat passage channels, with a catcher arranged at a distance from the valve seat in a direction of the longitudinal axis (L), and with a sealing element arranged movably between the valve seat and the catcher for opening and closing the valve seat passage channels, and with a damping element disposed between the sealing element and the catcher, at least one of the valve seat and the catcher having a plurality of passage channel limiting sections and a plurality of web portions, the passage channel limiting sections forming valve seat passage channels and/or catcher passage channels, wherein the passage channel limiting sections and the web portions each extend mutually at an angle (a), and wherein all the passage channel limiting sections are dimensioned shorter in the direction of the longitudinal axis (L) of the respective valve component than the web portions of the respective valve component, wherein at least one of the valve seat and the catcher is produced at least in sections by additive manufacturing, wherein the web portions of the respective valve component are free of support surfaces for the sealing element or the damping element, wherein the web portions of the respective valve component, on a side facing the sealing element or the damping element, are recessed in the direction of the longitudinal axis (L) with respect to one of the passage channel limiting sections, wherein the web portions extend radially with respect to the longitudinal axis (L), wherein the passage channel limiting sections are arranged spaced apart from each other in a radial direction and connected to the web portions, and wherein, in the direction of the longitudinal axis (L), the length of the passage channel limiting sections decreases towards the longitudinal axis (L), wherein, in the direction of the longitudinal axis (L), the passage channel limiting section closest to the longitudinal axis (L) has a length of no more than half the web portion and wherein, in the direction of the longitudinal axis (L), the length of the passage channel limiting sections decreases continuously towards the longitudinal axis (L).

2. The poppet valve according to claim 1, wherein the sealing element consists of a metal material.

3. The poppet valve according to claim 1, wherein, in the direction of the longitudinal axis (L), the passage channel limiting sections of the valve seat are at least one quarter shorter than the web portions of the valve seat.

4. The poppet valve according to claim 1, wherein each web portion is rectilinear along the entire length of said web portion.

5. The poppet valve according to claim 1, wherein the valve seat has a central section as well as an edge section and/or wherein the catcher has a central section as well as an edge section, and wherein the web portions extend in a spoke like manner between the central section and the edge section.

6. The poppet valve according to claim 1, wherein support surfaces for supporting the sealing element or the damping element are formed on the passage channel limiting sections.

7. The poppet valve according to claim 1, wherein each of the web portions projects on a side facing away from the sealing element or the damping element in the direction of the longitudinal axis (L) of the respective valve component with respect to one of the passage channel limiting sections of the respective valve component.

8. The poppet valve according to claim 1, wherein at least one of the passage channel limiting sections has a longitudinal sectional shape tapering in the direction of the longitudinal axis (L) of the respective valve component in an orientation away from the sealing element or from the damping element.

9. The poppet valve according to claim 1, wherein at least six web portions are arranged mutually spaced in the circumferential direction with respect to the longitudinal axis (L).

10. The poppet valve according to claim 1, wherein the web portions of the valve seat form part of a support structure, wherein the web portions extend outwardly from a central section of the valve seat to an edge section and are connected to the edge section, wherein the edge section forms an outer circumference of the valve seat and is part of the support structure, wherein the passage channel limiting sections are held by the support structure, and wherein the support structure is integrally formed together with the passage channel limiting sections.

11. The poppet valve according to claim 10, wherein all the passage channel limiting sections are dimensioned shorter in the direction of the longitudinal axis (L) than the support structure.

12. The poppet valve according to claim 1, wherein at least one of the valve seat passage channels and the catcher passage channels have a fluid mechanically aligned shaping in the direction of the longitudinal axis (L) and/or are formed between two adjacent passage channel limiting sections with fluid mechanically aligned shaping.

13. The poppet valve according to claim 12, wherein the catcher passage channels have an inclined and/or curved longitudinal section relative to the longitudinal axis (L) of the catcher.

14. The poppet valve according to claim 12, wherein at least some of the valve seat passage channels and/or the catcher passage channels are defined by surfaces of adjacent passage channel limiting sections having a shape changing at least in sections in the direction of the longitudinal axis (L) of the respective valve component.

15. A method for manufacturing valve components of a poppet valve, wherein the valve components comprise at least one of a valve seat and a catcher, by generating by additive manufacturing a support structure comprising a plurality of web portions, by also creating by additive manufacturing a plurality of passage channel limiting sections connected to the web portions, wherein the passage channel limiting sections are arranged such that valve seat passage channels and/or catcher passage channels are formed between the passage channel limiting sections, and wherein all the passage channel limiting sections are dimensioned shorter in the direction of the longitudinal axis (L) than the web portions of the respective valve component, and wherein the web portions of the respective valve component are formed free of support surfaces for a sealing element or a damping element, wherein the web portions of the respective valve component are recessed in the direction of the longitudinal axis (L) relative to the passage channel limiting sections, wherein the web portions are formed extending radially with respect to the longitudinal axis (L), wherein the passage channel limiting sections are arranged spaced apart from each other in a radial direction with respect to the longitudinal axis (L) and connected to the web portions, and wherein, in the direction of the longitudinal axis (L), the passage channel limiting sections are formed with decreasing length towards the longitudinal axis (L), wherein, in the direction of the longitudinal axis (L), the passage channel limiting section closest to the longitudinal axis (L) is formed with a length of at most half the length of the web portion in the longitudinal direction (L) and wherein, in the direction of the longitudinal axis (L), the length of the passage channel limiting sections decreases continuously towards the longitudinal axis (L).

16. The method according to claim 15, wherein, in the direction of the longitudinal axis (L), the passage channel limiting sections of the valve seat are formed at least one quarter shorter than the web portions of the valve seat.

17. The method according to claim 16, wherein, in the direction of the longitudinal axis (L), the passage channel limiting section closest to the longitudinal axis (L) is formed with a length of at most half the length of the web portion in the longitudinal direction (L).

\* \* \* \* \*